United States Patent
Owusu-Adom

(10) Patent No.: US 12,371,393 B2
(45) Date of Patent: Jul. 29, 2025

(54) CONTROLLED-RELEASE FERTILIZER COMPOSITIONS

(71) Applicant: OMS Investments, Inc., Los Angeles, CA (US)

(72) Inventor: Kwame Owusu-Adom, Delaware, OH (US)

(73) Assignee: OMS Investments, Inc., Los Angeles, CA (US)

(*) Notice: Subject to any disclaimer, the term of this patent is extended or adjusted under 35 U.S.C. 154(b) by 0 days.

(21) Appl. No.: 16/893,362

(22) Filed: Jun. 4, 2020

(65) Prior Publication Data

US 2020/0385321 A1 Dec. 10, 2020

Related U.S. Application Data

(60) Provisional application No. 62/857,506, filed on Jun. 5, 2019.

(51) Int. Cl.
| | |
|---|---|
| *C05G 5/12* | (2020.01) |
| *C05C 9/00* | (2006.01) |
| *C05G 5/30* | (2020.01) |
| *C08G 18/18* | (2006.01) |
| *C08G 18/32* | (2006.01) |
| *C08G 18/42* | (2006.01) |
| *C09D 175/08* | (2006.01) |

(52) U.S. Cl.
CPC .............. *C05G 5/37* (2020.02); *C05C 9/005* (2013.01); *C05G 5/12* (2020.02); *C08G 18/18* (2013.01); *C08G 18/3215* (2013.01); *C08G 18/4252* (2013.01); *C09D 175/08* (2013.01)

(58) Field of Classification Search
CPC ... C05G 5/37; C05G 5/12; C05G 3/20; C05G 3/90; C05G 5/38; C05G 3/40; C05C 9/005; C05C 9/00; C08G 18/18; C08G 18/3215; C08G 18/4252; C08G 3/40; C09D 175/08
See application file for complete search history.

(56) References Cited

U.S. PATENT DOCUMENTS

| | | | | |
|---|---|---|---|---|
| 5,538,531 | A * | 7/1996 | Hudson et al. | ........... C05C 9/00 71/28 |
| 7,416,785 | B2 * | 8/2008 | Mente et al. | ...... C08G 18/5027 428/407 |
| 7,722,696 | B2 * | 5/2010 | Winter et al. | .......... A01N 25/00 71/64.02 |
| 2013/0305796 | A1 * | 11/2013 | Hudson | ...................... C05C 9/00 71/27 |
| 2017/0283333 | A1 * | 10/2017 | Rosenthal et al. | ...... C05B 17/00 |
| 2022/0112135 | A1 * | 4/2022 | Peters | ........................ C05G 3/90 |

OTHER PUBLICATIONS

Coatings World, Cardolite introduces Cashew Nutshell Liquid-based Polyols for Coatings, Jan. 6, 2015 (Year: 2015).*

* cited by examiner

*Primary Examiner* — Jennifer A Smith

(57) ABSTRACT

A controlled-release fertilizer composition includes coated fertilizer particles having granules substantially encapsulated with a polyurethane coating layer formed from cardanol-based polyols and an isocyanate curing agent. Methods of making and using the controlled-release fertilizer compositions are also disclosed.

15 Claims, 1 Drawing Sheet

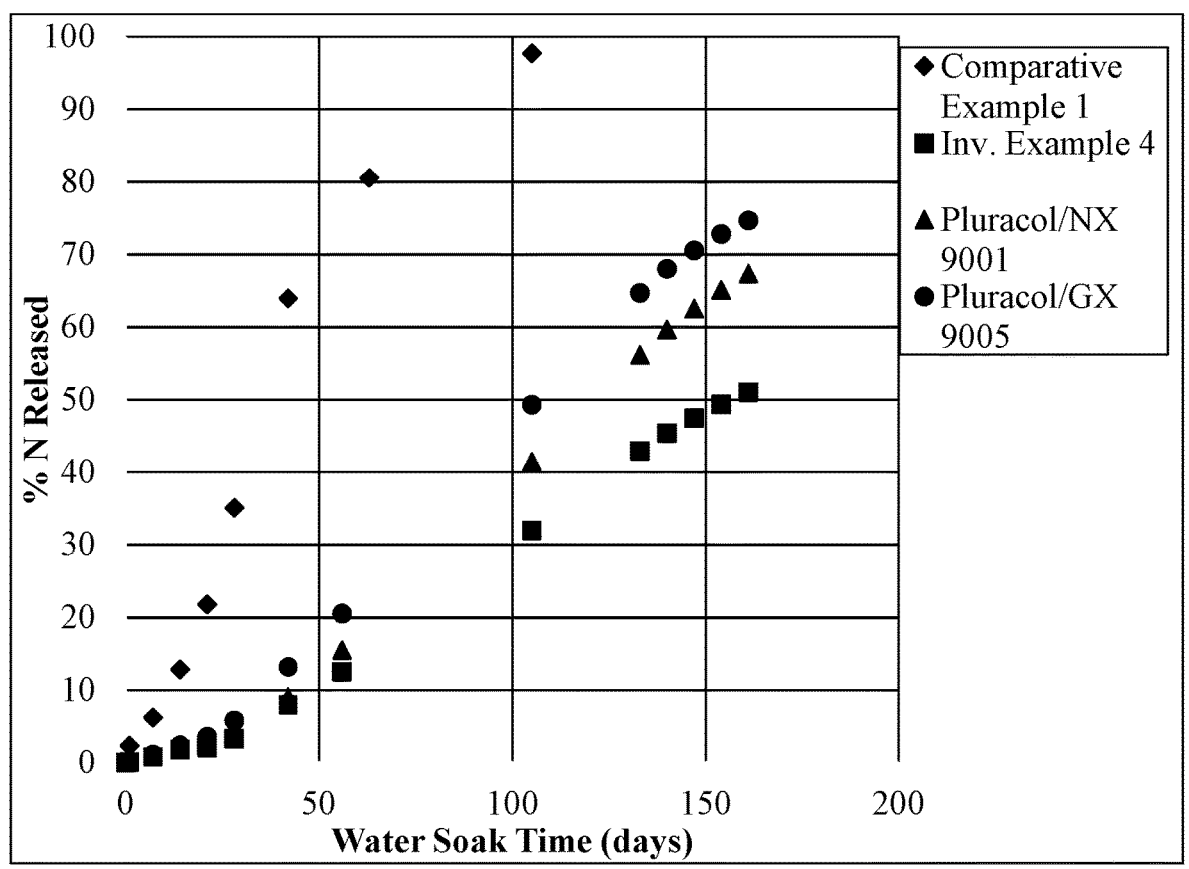

CONTROLLED-RELEASE FERTILIZER COMPOSITIONS

CROSS-REFERENCE TO RELATED APPLICATIONS

The present application claims the priority benefit of U.S. Provisional Patent App. Ser. No. 62/857,506, entitled CONTROLLED-RELEASE FERTILIZER COMPOSITIONS, filed Jun. 5, 2019, and hereby incorporates the same application herein by reference in its entirety.

TECHNICAL FIELD

The present disclosure relates generally to controlled-release fertilizer compositions which include coated fertilizer particles having granules substantially encapsulated by polyurethane coatings formed from a cardanol-based polyol and an isocyanate curing agent.

BACKGROUND

Controlled-release fertilizers offer a number of benefits compared to conventional fertilizers. For example, controlled-release fertilizers can provide an extended release of nutrients, minimize leaching of nutrients into the ground, and minimize the number of fertilizer applications required for optimal plant growth. One method of forming a controlled-release fertilizer is the encapsulation of granules with a barrier layer to form coated fertilizer particles which minimize elution of fertilizer. However, known encapsulating materials suffer from a number of drawbacks including the need for relativity thick coatings, poor nutrient release profiles, difficult manufacturing processes, and the use of environmentally unfriendly materials.

SUMMARY

According to one embodiment, a controlled-release fertilizer composition includes a plurality of coated fertilizer particles each including a granule and one or more polyurethane coating layers. The polyurethane coating layers substantially encapsulate the granule and are formed from the reaction product of a polyol composition and an isocyanate curing agent. The polyol composition includes a hydrophobic cardanol-based polyol.

According to another embodiment, a controlled-release fertilizer composition includes a plurality of coated fertilizer particles each including a granule and one or more polyurethane coating layers. The polyurethane coating layers substantially encapsulate the granule and are formed from the reaction product of a polyol composition and an isocyanate curing agent. The polyol composition includes a cardanol-based polyol, an aromatic amine-based polyol, and a polyether polyol.

According to another embodiment, a method of making a controlled-release fertilizer composition includes coating granules with a polyol composition and applying an isocyanate curing agent to the polyol composition to form a polyurethane coating layer substantially encapsulating each granule. The polyol composition is miscible with the isocyanate curing agent. The polyol composition includes a hydrophobic cardanol-based polyol.

According to another embodiment, a method of making a controlled-release fertilizer composition includes coating granules with a polyol composition and applying an isocyanate curing agent to the polyol composition to form a polyurethane coating layer substantially encapsulating each granule. The polyol composition is miscible with the isocyanate curing agent. The polyol composition includes a cardanol-based polyol, an aromatic-amine based polyol, and a polyether polyol.

BRIEF DESCRIPTIONS OF THE DRAWINGS

FIG. 1 depicts a graph illustrating the nutrient release profiles of several example controlled-release fertilizer compositions.

DETAILED DESCRIPTION

The present disclosure generally describes methods of forming coated fertilizer particles by substantially encapsulating granules with polyurethane coatings formed from cardanol-based polyols and isocyanate curing agents to form controlled-release fertilizer compositions. Such controlled-release fertilizer compositions demonstrate improved properties including desirable fertilizer release profiles and lower coating weights. The cardanol-based polyols can be used either alone or in combination with other polyols to coat granules.

As used herein, cardanol-based polyols means polyols formed from cardanol, cardol, derivatives thereof, and oligomers thereof.

As can be appreciated, cardanol has the general chemical structure depicted in Formula I:

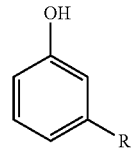

Formula I wherein $R=C_{15}H_{31-n}$, and $n=0$, 2, 4, or 6. As can be appreciated, cardanol compounds can have varying degrees of saturation including tri-unsaturated alkyl chains, bi-unsaturated alkyl chains, mono-unsaturated alkyl chains, and fully saturated alkyl chains.

A cardanol compound, such as the cardanol depicted in Formula I, can be converted into a cardanol-based polyol through the introduction of multiple hydroxyl functional groups to the cardanol compound in any suitable manner. As can be appreciated, the addition of multiple hydroxyl functional groups facilitates polymerization of the cardanol-based polyol into crosslinked polyurethane when reacted with an isocyanate curing agent. Suitable cardanol-based polyols can be commercially obtained. For example, suitable cardanol-based polyols such as NX 9001 and GX 9005 are available from Cardolite Specialty Chemicals (Monmouth Junction, NJ).

Selection of specific cardanol-based polyols for the controlled-release fertilizer compositions described herein can vary depending upon the desired properties of the resulting polyurethane coating. For example, it is generally believed that the use of cardanol-based polyols having greater hydrophobicity can form more desirable controlled-release fertilizer compositions. As can be appreciated, selection of cardanol-based polyols having greater hydrophobicity can mean that the encapsulated granules are less likely to allow moisture and water to diffuse easily in and out of the encapsulated fertilizer and are more likely to provide an extended nutrient release profile at a relatively lower coat weight. Certain hydrophobic cardanol polyols can have long alkyl chains.

Cardanol-based polyols can generally form polyurethanes of exceptional durability and flexibility. As can be appreciated, flexibility and durability can prevent damage caused by mechanical abrasion, stress and the like. The durability of the cardanol-based polyols is believed to occur, at least in part, due to the pendant alkyl chain of the cardanol-based polyols.

In certain embodiments, a blend of various cardanol-based polyols can be utilized to reach a desired blend of properties. As can be appreciated, substantially all cardanol compounds, including cardanol-based polyols, can be partially or fully bio-sourced. For example, cardanol-based polyols can be formed from by-products of cashew nut processing (e.g., cashew nut shell liquid). Being bio-sourced, such cardanol-based polyols can be an environmentally friendly alternative to traditional petroleum-based polyols.

In certain embodiments, granules can be substantially entirely encapsulated with a polyol mixture which includes substantially entirely only cardanol-based polyols to form coated fertilizer particles. In certain embodiments, the polyol mixture can consist exclusively of cardanol-based polyols. Polyurethane coatings formed from the reaction product of exclusively cardanol-based polyols and isocyanate curing agents can offer a number of advantages over traditionally formed polyurethane coatings. For example, the use of exclusively cardanol-based polyols can reduce the number of constituents needed to form polyurethane coating layers, improve miscibility of the isocyanate curing agent, and improve the hydrophobicity of the polyurethane coating layers. In certain embodiments, application of wax coating layer to the coated fertilizer particles can also be avoided.

Alternatively, cardanol-based polyols can be blended with other polyols including other hydrophobic polyols. In certain embodiments, the cardanol-based polyols can be blended with hydrophobic aromatic amine-based polyols and hydrophobic polyether polyols (e.g. ethylene oxide polyols and propylene oxide polyols).

In certain embodiments, suitable aromatic amine-based polyols can generally be derived from the aromatic amine depicted in Formula II:

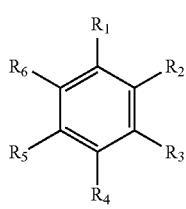

Formula II wherein $R_1$ includes one of an alkyl group, an amine group, and a hydrogen and each of $R_2$ to $R_6$ independently includes one of an amine group and a hydrogen and wherein at least one of $R_1$ to $R_6$ is an amine group. Suitable aromatic amine-based polyols can be formed from aromatic amines in any suitable manner. In certain embodiments, suitable aromatic amine-based polyols can include alkylene oxide substituents such as ethylene oxide, propylene oxide, butylene oxide, amylene oxide, alkylene oxide-tetrahydrofuran mixtures, epihalohydrins, and alkylene styrene. Further, suitable aromatic amine-based polyols can have an OH number from 300 to 600 and a nominal functionality from 1 to 7 in certain embodiments.

Suitable aromatic amine-based polyols can be commercially obtained. For example, certain aromatic amine-based polyols sold under the tradename Puracol® and available from the BASF Corporation (Wyandotte, MI). Additional examples of suitable aromatic amine-based polyols are described in U.S. Pat. No. 7,416,785, the disclosure of which is hereby incorporated herein by reference.

Suitable polyether polyols can generally be selected from known organic oxides such as ethylene oxide, propylene oxide, 1,2-butylene oxide, and epichlorohydrin. As can be appreciated, a large selection of suitable polyether polyols can also be commercially obtained including certain polyether polyols sold under the tradename Puracol® and available from the BASF Corporation (Wyandotte, MI).

As can be appreciated, cardanol-based polyols can be blended with any amount of additional polyols. For example, the cardanol-based polyols can be blended to form a polyol composition including about 1% cardanol-based polyols to about 99% cardanol-based polyols in certain embodiments. By varying the amount of cardanol-based polyols to other polyols (e.g., aromatic amine-based polyols or polyether polyols), the nutrient release profile and durability of the controlled-release fertilizer compositions can be controlled. For example, greater quantities of the cardanol-based polyols can be included to improve the durability and extend the nutrient release profile.

As can be appreciated, a blend of cardanol-based polyols and other hydrophobic polyols can also offer the benefits of each type of polyol. For example, inclusion of aromatic amine-based polyols can increase the reaction kinetics used to form the polyurethane coating layers when compared to coatings formed exclusively from cardanol-based polyols due to the aromatic amine-based polyols diminished need for a catalyst. A blend of polyols can also balance the mechanical properties of each of type of polyol. Additionally, for existing manufacturing facilities already processing polyols, introduction of a cardanol-based polyol in a blend with the existing polyols can reduce, or eliminate, the need to update any processing equipment or steps.

As can be appreciated, the polyols described herein can form a polyurethane coating layer when reacted with an appropriate curing agent such as, for example, an isocyanate curing agent. Generally, such polyols and isocyanate curing agents can be mixed at an approximately 1:5 ratio, an approximately 1:4.5 ratio, an approximately 1:4 ratio, an approximately 1:3 ratio, an approximately 1:2 ratio, or an approximately 1:1 ratio to form the polyurethane coating layers according to various embodiments. As can be appreciated, increasing the amount of the curing agent can increase the amount of polyurethane crosslinking and increase the mechanical strength of the polyurethane coating. The rate of the polymerization reaction can vary depending upon, for example, the amount of amine-based polyol, the amount of the curing agent, and the amount of the catalyst, if any, used to form the coating.

In certain embodiments, it can be advantageous to select polyols and isocyanate curing agents which are miscible with one another. As can be appreciated, miscibility can facilitate manufacturing and can reduce, or eliminate, any unreacted components and reduce the reaction time to form the polyurethane coating. In certain embodiments, miscible polyols and isocyanate agents can be applied separately to a granule as a result of their miscibility.

A large variety of isocyanate curing agents can be suitable for the formation of the controlled-release fertilizer compositions described herein. For example, suitable isocyanate curing agents can include aliphatic isocyanates, aromatic isocyanates, heterocyclic isocyanates, and oligomers or polymers thereof. In certain embodiments, suitable isocyanate curing agents can have two or more isocyanate groups per molecule.

In certain embodiments, it can be useful for the isocyanate curing agent to be chemically related to the selected polyols so as to facilitate, for example, compatibility and miscibility with the selected polyol with the isocyanate curing agent. In certain such embodiments, suitable isocyanate curing agents can be an aromatic amine-based isocyanate such as a toluene-derived isocyanate curing agent. As can be appreciated, suitable isocyanate curing agents can also be commercially obtained and can include isocyanate curing agents sold under the tradename Lupranate®. Lupranate® isocyanate curing agents are available from the BASF Corporation (Wyandotte, MI).

Generally, the polyols and isocyanate curing agents described herein can be used to encapsulate any desirable type of granule to decrease the rate at which the fertilizer components in the granule are made available to desired soil and vegetation. Suitable granules which can be encapsulated by the polyols and isocyanate curing agents described herein can vary widely and can include, for example, nitrogen fertilizer compounds, phosphate fertilizer compounds, potash fertilizer compounds, sulfur fertilizer compounds, potassium fertilizer compounds, calcium fertilizer compounds, various metal fertilizer compounds, micro-nutrients, and combinations thereof. In certain embodiments, the granules can include nitrogen-based fertilizers such as urea, NPK, or calcium ammonium nitrate. Additionally, or alternatively, granules as described herein can include any other materials which can be beneficial to soil or vegetation. For example, suitable granules can further include herbicides, insecticides, fungicides, and fragrances.

According to certain embodiments, the process of coating a granule can include application of the selected polyol and isocyanate curing agent to the granule to be encapsulated. For example, a polyol mixture can be applied to the granule followed by application of the isocyanate curing agent to form a polyurethane coating layer substantially entirely surrounding the granule. In certain embodiments, the polyol mixture and the isocyanate curing agent can be applied in an approximately 1:1 ratio but other ratios can alternatively be selected. In certain embodiments, more than one coating layer can be sequentially applied. For example, in certain embodiments, two, three, four, or even more coating layers can be applied to encapsulate a granule and form the coated fertilizer particle. Generally, the selected polyol and isocyanate curing agent can be applied using any suitable coating process including, for example, spray coating, roll coating, dip coating, and any other known coating process.

In certain embodiments, the controlled-release fertilizer compositions described herein can be formed by roll coating of urea. In such embodiments, urea can be heated to a temperature of about 170° F. (76.6° C.) in a rotary drum. Once heated, the selected polyol or blend of polyols can be applied and allowed to coat the urea granules for about 3 minutes. Subsequently, the isocyanate curing agent can be applied and allowed to react for about 3 minutes to form a polyurethane coating layer. Additional polyurethane coating layers can be similarly formed.

As can be appreciated, alternative processes can also be suitable. For example, the selected polyol and isocyanate curing agent can be premixed before application to the fertilizer particle in a single step.

As can be appreciated, a variety of optional components can further be included in various embodiments. For example, small amounts of a catalyst can be included in certain embodiments to accelerate the polymerization reaction between the selected polyol and the isocyanate curing agent. In certain such embodiments, a catalyst can be included at about 0.5% to about 5%, 0.75% to about 3%, or about 1% to about 2%, by weight of the polyol. Suitable catalysts can include amine-based catalysts such as triethanolamine, trimethyl amine, triethyl amine, tetraethylene diamine, 1,8-Diazabicyclo[5.4.0]undec-7-ene ("DBU"), 1,5-diazabicyclo[4.3.0]non-5-ene ("DBN"), dimethylethyl amine and dimethylisopropyl amine. Alternatively, suitable catalysts can be a metal salt catalyst such as ferric acetylacetonate and dibutyltin dilaurate ("DBTL"). In certain such embodiments, metal salt catalysts can be included at about 50 parts-per-million ("ppm") to about 1,000 ppm, about 100 ppm to about 750 ppm, or about 200 ppm to about 500 ppm, of the polyol.

As can be appreciated, still other optional components can be further included in the controlled-release fertilizer compositions, in either the granule or in the coating layers. For example, drying agents such as calcium sulfate can be used to remove water before an encapsulation step or to help prevent the granules from agglomerating. Additionally, colorants can be included to facilitate easy identification of the controlled-release fertilizer compositions.

In certain embodiments, a wax can be applied to the outside of coated fertilizer particles to provide additional water resistance to the controlled-release fertilizer compositions. In such embodiments, coated fertilizer particles can be heated to a suitable temperature (e.g., about 70° C.) and then coated with a molten wax and tumbled to evenly coat the wax over the coated fertilizer particles. As can be appreciated however, the strength of the hydrophobicity exhibited by certain cardanol-based polyols can reduce or eliminate the need to further treat the coated fertilizer particles with a wax coating.

As can be appreciated, the release profile of a coated fertilizer particle can depend on a variety of different factors. For example, the rate at which the fertilizer present in a granule is released into the desired soil and vegetation can depend on the physical durability of the coating material, the diffusion rate of water in and out of the encapsulating material, and the overall coating weight (e.g., thickness of the polyurethane coatings). As can be appreciated, many of the factors can be influenced by selection of the polyol and isocyanate curing agent. More durable encapsulating materials can facilitate the formation of a controlled-release fertilizer composition having superior handling characteristics.

Controlled-release fertilizer compositions having lower coating weights can be extremely beneficial. A lower coating weight can mean that a controlled-release fertilizer composition can include more fertilizer for a given weight and/or volume of the fertilizer composition. Additionally, reduction of the coating weight can, in certain embodiments, simplify production of the controlled-release fertilizer composition by allowing fewer coating layers to be applied to the granules reducing the expenditure of time, materials, and energy. As can be appreciated, each coating applied around a fertilizer particle can increase both the time and difficulty of the production process.

As can be appreciated, the controlled-release fertilizer compositions described herein can be blended with additional fertilizer compounds. For example, additional slow-release nitrogen compounds such as triazones, urea-triazones (such as tetrahydro-s-triazone or 5-methyleneuriedo-2-oxohexahydro-s-triazine), methylene urea products, and isobutylidene-diurea ("IBDU") can be blended with the coated fertilizer particles to further tailor the nitrogen release profile over time. The addition of such fertilizer compounds can also allow the controlled-release fertilizer compositions to include any suitable amount of nitrogen. For example, in certain embodiments, the controlled-release fertilizer compositions can include from about 1% to about 99%, by weight, nitrogen. In certain embodiments, the fertilizer compositions can include from about 20% to about 70%, by weight, nitrogen including, for example, from about 20% to about 50%, by weight, nitrogen. In various embodiments, the amount, by weight, nitrogen in a fertilizer composition can be about 1%, about 2%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 99%.

Additionally, or alternatively, various types of fast-release nitrogen compounds can be blended with the controlled-release fertilizer compositions. Examples of suitable fast-release nitrogen compounds can include one or more of urea, ammonium nitrate, and ammonium sulfate.

In certain embodiments, the controlled-release fertilizer compositions described herein can further be mixed with one or more non-encapsulated components. For example, the fertilizer compositions can be mixed with non-encapsulated phosphorus, potassium, calcium, magnesium, manganese, molybdenum, sulfur, or zinc.

The controlled-release fertilizer compositions described herein can be applied to a seed, seedling, plant, or lawn by sprinkling, or spreading (for example, with a mechanical spreader), the composition onto the soil, seed, seedling, plant or lawn.

In certain embodiments, a fertilizer composition described herein can be applied in amounts of from about 0.1 lb. of nitrogen per 1000 ft$^2$ to about 6 lbs. of nitrogen per 1000 ft$^2$. In certain embodiments, the fertilizer compositions can be formulated as a ready-to-use or ready-to-spray formulation.

Examples

The following examples are included to illustrate certain aspects and embodiments of the present disclosure, and are not intended to limit the disclosure to these described embodiments.

Nutrient release profiles of various fertilizer compositions were determined by adding 10 g of a fertilizer composition to a jar with 100 g of deionized water maintained at room temperature (e.g., about 22° C.) and sealing the jar. The jar was rolled daily to disperse any released nitrogen evenly throughout the water. Aliquots of water were removed at measured intervals to determine the quantity of nitrogen released from the fertilizer composition. The nutrient release profiles indicate the rate at which nutrients of the fertilizer composition are released into soil.

Table 1 depicts the nutrient release profiles of several example fertilizer compositions formed from the encapsulation of urea granules. The urea granules were encapsulated with polyurethane formed from the reaction of a cardanol-based polyol and an isocyanate curing agent.

Specifically, each of Inventive Examples 1 to 4 was formed from a blend of GX 9005 polyol obtained from Cardolite Specialty Chemicals (Monmouth Junction, NJ) and Lupranate® M20 obtained from the BASF Corporation (Wyandotte, MI) at a mole ratio of 2:1 polyol blend to isocyanate. GX 9005 is a hydrophobic cardanol polyol while Lupranate® M20 is a 4,4'-methylene diphenyl isocyanate having a functionality of about 2.7. Inventive Examples 1 and 2 further included 100 parts-per-million ("ppm") by weight, of ferric acetylacetonate as a catalyst while Inventive Examples 3 and 4 further included 1%, by weight triethanolamine as a catalyst. Inventive Examples 2 and 4 were further coated with a wax, Evacote®, obtained from The International Group, Inc. (Toronto, ON). The total coat weight of Examples 1 and 3 was 3.8 parts per 100 parts urea. The total coat weight of examples 2 and 4 was 4.3 parts per 100 parts urea.

A control, Comparative Example 1, was further evaluated. Comparative Example 1 included a blend of polyol (Puracol® 1500 and Pluracol® 1578) and Lupranate® M20, each obtained from the BASF Corporation (Wyandotte, MI). The total coat weight was 4.3 parts per 100 parts urea.

TABLE 1

| Water Soak Time (days) | Comparative Example 1 (% N released) | Inv. Example 1 (% N released) | Inv. Example 2 (% N released) | Inv. Example 3 (% N released) | Inv. Example 4 (% N released) |
|---|---|---|---|---|---|
| 0 | 0 | 0 | 0 | 0 | 0 |
| 1 | 2 | 5 | 0 | 1 | 0 |
| 7 | 6 | 13 | 2 | 2 | 1 |
| 14 | 13 | 23 | 4 | 5 | 2 |
| 21 | 22 | 32 | 5 | 10 | 2 |
| 28 | 35 | 46 | 8 | 22 | 3 |
| 42 | 64 | 67 | 14 | 44 | 8 |
| 63 | 81 | — | 24 | — | — |
| 70 | — | 89 | — | 69 | — |
| 77 | — | — | 29 | — | — |
| 91 | — | — | 35 | — | — |
| 98 | — | 97 | — | 82 | — |
| 105 | 98 | — | 40 | — | 32 |

As depicted by Table 1, Inventive Example 3, having a lower total coating weight, exhibited a desirable release of urea over time being slower than Comparative Example 1, but faster than wax coated Inventive Examples 2 and 4. Advantageously, Inventive Example 3 exhibited such a desirable release profile despite having a coating weight of only 3.8 parts per 100 parts urea.

Table 2 illustrates the effect total coat weight has on the release profile of urea. Inventive Examples 5 to 7 in Table 2 were formed from a blend of cardanol-based polyols and Lupranate® M20. Comparative Examples 1 to 3 are also included in Table 2. Each of Comparative Examples 1, 2, and 3 were formed from a blend of aromatic-amine based polyols and polyether polyols (Puracol® 1500 and Pluracol® 1578) and Lupranate® M20.

Inventive Example 5 has a total coat weight of 2.0 parts per 100 parts of the fertilizer composition, Inventive Example 6 has a total coat weight of 2.8 parts per 100 parts of the fertilizer composition, and Inventive Example 7 has a total coat weight of 3.2 parts per 100 parts of the fertilizer composition. Comparative Example 1, also depicted in Table 1, has a total coat weight of 4.3 parts per 100 parts of the fertilizer composition. Comparative Example 2 has a total coat weight of 2.3 parts per 100 parts of the fertilizer, and Comparative Example 3 has a total coat weight of 9.6 parts per 100 parts of the fertilizer composition.

TABLE 2

| Water Soak Time (days) | Inv. Example 5 (% N released) | Inv. Example 6 (% N released) | Inv. Example 7 (% N released) | Comparative Example 1 (% N released) | Comparative Example 2 (% N released) | Comparative Example 3 (% N released) |
| --- | --- | --- | --- | --- | --- | --- |
| 0  | 0  | 0  | 0 | 0   | 0   | 0  |
| 1  | 18 | 0  | 0 | 2   | 42  | 0  |
| 7  | 57 | 5  | 1 | 6   | 77  | 2  |
| 14 | 75 | 12 | 1 | 13  | 93  | 3  |
| 21 | 84 | 18 | 2 | 22  | 99  | 4  |
| 28 | 90 | 25 | 4 | 35  | 100 | —  |
| 42 | —  | —  | — | 64  | —   | 7  |
| 63 | —  | —  | — | 81  | —   | —  |
| 70 | —  | —  | — | —   | —   | 17 |

Table 2 illustrates that by increasing the coat weight, the rate of urea released decreased. As can be appreciated, controlling the coat weight can allow the nutrient release profile of a fertilizer composition to be tailored as needed. Table 2 also continues to illustrate that examples formed with cardanol-based polyols exhibit a slower urea release rate than comparative examples formed from a blend of aromatic-amine based polyols and polyether polyols.

Nutrient release profiles were also generated for example fertilizer compositions formed using a blend of cardanol-based and aromatic amine-based polyols. Table 3 depicts example fertilizer compositions formed from blends of varying amounts of NX 9001 and a 50/50 blend of Pluracol® 1500 and Puracol® 1578. NX 9001 is a cardanol-based polyol from Cardolite Specialty Chemicals (Monmouth Junction, NJ) which has a higher hydroxyl equivalent weight, 180, than GX 9005 having a hydroxyl equivalent weight of 163. NX 9001 also has a lower viscosity (2,400 centipoise) than GX 9005 (3,600 centipoise). Inventive Example 8 has 5% NX 9001, Inventive Example 9 has 25% NX 9001, and Inventive Example 10 has 50% NX 9001. Comparative Example 1 is included as a control because it includes no cardanol-based polyol.

TABLE 3

| Water Soak Time (days) | Comparative Example 1 (% N released) | Inv. Example 8 (% N released) | Inv. Example 9 (% N released) | Inv. Example 10 (% N released) |
| --- | --- | --- | --- | --- |
| 0  | 0  | 0  | 0  | 0  |
| 1  | 2  | 0  | 0  | 0  |
| 7  | 6  | 1  | 1  | 0  |
| 14 | 13 | 1  | 1  | 1  |
| 21 | 22 | 3  | 2  | 2  |
| 42 | 64 | 17 | 8  | 4  |
| 70 | —  | 40 | 18 | 11 |

As depicted in Table 3, the use of a cardanol-based polyol improves the nutrient release profile by decreasing the rate at which urea elutes into the water. Table 3 also illustrates that a cardanol-based polyol can be mixed with other aromatic polyols and still form advantageous controlled-release fertilizer compositions.

Similar to Table 3, Table 4 depicts Example fertilizer compositions alternatively formed using the more hydrophobic GX 9005 polyol. Inventive Example 11 has 5% GX 9005, Inventive Example 12 has 25% GX 9005, and Inventive Example 13 has 50% GX 9005. As can be appreciated, Comparative Example 1 is included as a control because it contains no cardanol-based polyol.

TABLE 4

| Water Soak Time (days) | Comparative Example 1 (% N released) | Inv. Example 11 (% N released) | Inv. Example 12 (% N released) | Inv. Example 13 (% N released) |
| --- | --- | --- | --- | --- |
| 0  | 0  | 0  | 0  | 0  |
| 1  | 2  | 0  | 0  | 1  |
| 7  | 6  | 0  | 0  | 1  |
| 14 | 13 | 1  | 1  | 2  |
| 21 | 22 | 3  | 2  | 3  |
| 42 | 64 | 17 | 9  | 7  |
| 70 | —  | 39 | 23 | 15 |

Table 4 illustrates that a variety of cardanol-based polyols can be blended with conventional aromatic polyols.

FIG. 1 depicts a graph illustrating the performance of controlled release fertilizer compositions formed from cardanol-based polyols. Specifically, FIG. 1 illustrates that the hydrophobic GX 9005 cardanol-based polyol exhibits superior performance alone while blends of either GX 9005 or NX 9001 cardanol-based polyols also exhibit good performance when mixed with other polyols including aromatic amine-based polyols and polyether polyols.

Attrition resistance was also measured for example fertilizer compositions. Each example included in Table 5 includes 4.3%, by weight, of a coating. Attrition resistance was characterized by mixing 100 g of an Example fertilizer composition in a tin can with stainless steel ball bearings. The sealed tin can was then placed in a painter shaker (Tornado II Portable Paint Shaker, Model 51000) for one minute. The samples were then measured in accordance with the nutrient release profiles of Tables 1 to 4. Comparative Example 2, Inventive Example 10, and Inventive Example 13 from Tables 3 and 4 were evaluated.

TABLE 5

| Water Soak Time (days) | Comparative Example 2 (% N released) | Inv. Example 10 (% N released) | Inv. Example 13 (% N released) |
| --- | --- | --- | --- |
| 0  | 0  | 0  | 0  |
| 1  | 14 | 2  | 2  |
| 7  | 36 | 9  | 7  |
| 14 | 51 | 14 | 10 |
| 21 | 60 | 16 | 11 |
| 28 | 67 | 19 | 13 |

As indicated by Examples 10 and 13, the inclusion of a cardanol-based polyol dramatically lowers the release of urea into water as compared to the fertilizer composition of Example 8 formed using only conventional aromatic amine-based polyols. These results indicate that polyurethane coatings including a cardanol-based polyol are significantly more resistant to abrasion damage.

As used herein, all percentages (%) are percent by weight of the total composition, also expressed as weight/weight %, % (w/w), w/w, w/w % or simply %, unless otherwise indicated.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A controlled-release fertilizer composition comprising:
a plurality of coated fertilizer particles each consisting of a granule, four or more polyurethane coating layers, and optionally a wax coating layer, wherein the four or more polyurethane coating layers substantially encapsulate the granule and the innermost layer of the four or more polyurethane coating layers contacts the granule; and
wherein the four or more polyurethane coating layers are formed from the reaction product of a polyol composition and an isocyanate curing agent;
wherein the polyol composition comprises a hydrophobic cardanol-based polyol and an aromatic amine-based polyol;
wherein the granule consists of urea.

2. The controlled-release fertilizer composition according to claim 1, wherein the coated fertilizer particles comprise about 1% to about 5%, by weight, of the four or more polyurethane coating layers.

3. The controlled-release fertilizer composition according to claim 1, wherein the coated fertilizer particles comprise the wax coating layer surrounding the four or more polyurethane coating layers.

4. The controlled-release fertilizer composition according to claim 1, wherein the isocyanate curing agent comprises one or more of a polymeric isocyanate, an aromatic isocyanate, and 4,4'-methylene diphenyl isocyanate.

5. The controlled-release fertilizer composition according to claim 1, wherein the ratio of the polyol composition to the isocyanate curing agent is about 1:4 to about 1:1.

6. The controlled-release fertilizer composition according to claim 1, wherein the four or more polyurethane coating layers comprise a catalyst selected from one of an amine-based catalyst or a metal salt catalyst.

7. The controlled-release fertilizer composition according to claim 1, wherein the polyol composition further comprises a polyether polyol.

8. The controlled-release fertilizer composition according to claim 7 wherein the polyether polyol comprises one or more of an ethylene oxide polyol and a propylene oxide polyol.

9. The controlled-release fertilizer composition according to claim 7, wherein the polyol composition comprises about 1% to about 99%, by weight, of the cardanol-based polyol.

10. The controlled-release fertilizer composition according to claim 1 has a nutrient release profile of about 90 days or greater.

11. A method of fertilizing comprising applying the controlled-release fertilizer composition according to claim 1 to soil.

12. A method of making a controlled-release fertilizer composition comprising:
coating granules consisting of urea with a polyol composition; and
applying an isocyanate curing agent to the polyol composition to form an initial polyurethane coating layer substantially encapsulating each granule, the initial polyurethane coating layer contacting the granule;
forming three or more additional polyurethane coating layers overlying the initial polyurethane coating layer; and
wherein the polyol composition is miscible with the isocyanate curing agent;
wherein the polyol composition comprises a hydrophobic cardanol-based polyol and an aromatic amine-based polyol; and
wherein the controlled-release fertilizer composition consists of the granule, four or more polyurethane coating layers, and optionally a wax coating.

13. The method according to claim 12, wherein the polyol composition and the isocyanate curing agent are included in about a 1:4 ratio to an about a 1:1 ratio.

14. The method according to claim 12, wherein the polyol composition further comprises a polyether polyol.

15. The method according to claim 12, wherein the polyol composition comprises about 1% to about 99%, by weight, of the cardanol-based polyol.

* * * * *